United States Patent [19]

Funahashi

[11] Patent Number: 4,970,393
[45] Date of Patent: * Nov. 13, 1990

[54] IRRADIATION FIELD RECOGNIZING METHOD, AND METHOD OF ADJUSTING IMAGE PROCESSING CONDITIONS USING THE SAME

[75] Inventor: Takeshi Funahashi, Kanagawa, Japan

[73] Assignee: Fuji Photo Film Co., Ltd., Kanagawa, Japan

[ * ] Notice: The portion of the term of this patent subsequent to Feb. 21, 2006 has been disclaimed.

[21] Appl. No.: 125,085

[22] Filed: Nov. 25, 1987

[30] Foreign Application Priority Data

Nov. 25, 1986 [JP] Japan .................................. 61-280118
Nov. 25, 1986 [JP] Japan .................................. 61-280119

[51] Int. Cl.⁵ .............................................. G01N 23/04
[52] U.S. Cl. ................................ 250/327.2; 250/484.1
[58] Field of Search ..................... 250/327.2, 484.1; 364/414; 382/22, 19, 54; 358/284, 283, 282

[56] References Cited

U.S. PATENT DOCUMENTS 4,258,264 3/1981 Kotera et al. ..................... 250/484.1
4,527,060 7/1985 Suzuki et al. ..................... 250/327.2
4,682,028 7/1987 Tanaka et al. .................... 250/327.2

FOREIGN PATENT DOCUMENTS 56-11395 2/1981 Japan .................................. 250/327.2

OTHER PUBLICATIONS

Young et al., Handbook of Pattern Recogn. and Image Process, Academic Press (1986) p. 193.

Primary Examiner—Janice A. Howell
Assistant Examiner—Richard Hanig
Attorney, Agent, or Firm—Sughrue, Mion, Zinn, Macpeak & Seas

[57] ABSTRACT

In a method of recognizing an irradiation field, image signals at their respective positions on a recording medium carrying a radiation image stored thereon are detected from image information obtained by image read-out. A difference image constituted by difference values between the image signals is created and scanned in one direction to detect sections each intercepted between a difference value not smaller than a threshold value $+Th$ and a difference value not larger than $-Th$ on each scanning line. Or, the difference image is scanned in two or more directions to detect ranges each comprising a group of the intercepted sections on the scanning lines in each of the scanning directions. The total of the sections or a region formed based on the ranges is the irradiation field. In a method of adjusting the image processing conditions, the image processing conditions are adjusted based on the image information inside of the recognized irradiation field.

12 Claims, 5 Drawing Sheets

FIG. 2
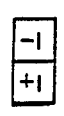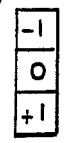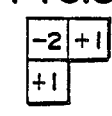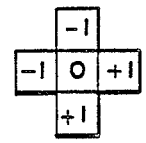
FIG.3A  FIG.3B  FIG.3C  FIG.3D  FIG.3E  FIG.3F LY1 LY2 LY3 LY4 LYi LYn LXi LYi FIG. 14
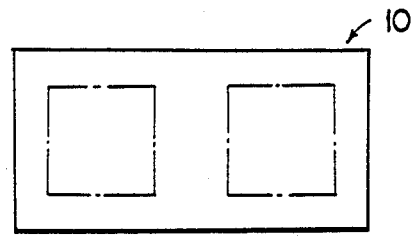
FIG. 15
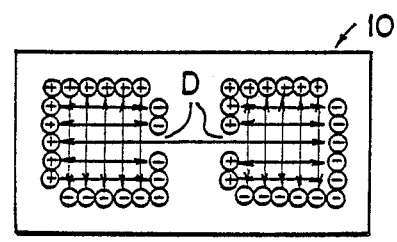
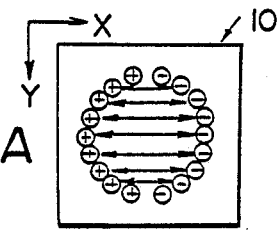
FIG.16A
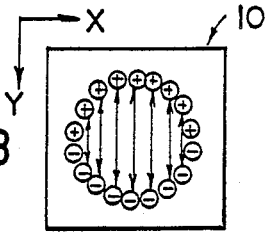
FIG.16B
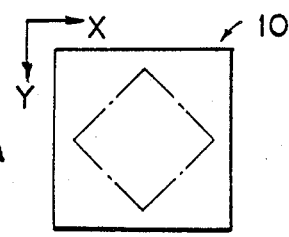
FIG.17A
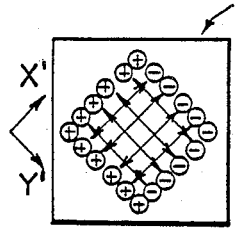
FIG.17B

IRRADIATION FIELD RECOGNIZING METHOD, AND METHOD OF ADJUSTING IMAGE PROCESSING CONDITIONS USING THE SAME

BACKGROUND OF THE INVENTION

1. Field of the Invention

This invention relates to a method of recognizing an irradiation field in the case where a radiation image is recorded on a recording medium such as a stimulable phosphor sheet by limitation of the irradiation field of the radiation. This invention also relates to a method of adjusting the image processing conditions by utilization of the method of recognizing an irradiation field in the course of the processing of the image information detected from the recording medium.

2. Description of the Prior Art

When certain kinds of phosphors are exposed to radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, image processing is carried out on the electric image signals, and the radiation image of the object is reproduced as a visible image by use of the processed image signals on a recording material such as a photographic film, a display device such as a cathode ray tube (CRT), or the like.

In the aforesaid radiation image recording and reproducing system, in order to improve the image quality, particularly the diagnostic efficiency and accuracy, of the visible image, image read-out for photoelectrically detecting the light emitted by the stimulable phosphor sheet upon stimulation thereof should preferably be carried out by use of read-out conditions adjusted to appropriate values in accordance with each radiation image. From this viewpoint, one embodiment of the aforesaid radiation image recording and reproducing system has been proposed in, for example, Japanese Unexamined Patent Publication No. 58(1983)-67240. In the proposed embodiment, before final read-out is carried out by scanning the stimulable phosphor sheet carrying a radiation image of an object stored thereon by stimulating rays which cause the stimulable phosphor sheet to emit light in proportion to the radiation energy stored, detecting the emitted light by a photoelectric read-out means and converting it into electric image signals, the preliminary read-out for approximately detecting the image information stored on the stimulable phosphor sheet is carried out by use of stimulating rays of a level lower than the level of the stimulating rays used in the final read-out. Read-out conditions for the final read-out are adjusted on the basis of the information obtained by the preliminary read-out, and the final read-out is carried out by use of the read-out conditions. The electric image signals obtained by the final read-out are sent to an image processing means and are processed in accordance with the image recording portion of the object and/or the image recording method to obtain a visible image suitable for viewing, particularly for diagnostic purposes. The processed image signals are used to reproduce the visible image on a photographic film or the like.

By the term "read-out conditions" as used herein are meant various conditions affecting the relationship between the input to the read-out means and the output thereof, for example, the relationship between the input to the photoelectric read-out means (i.e. the amount of light emitted by the stimulable phosphor sheet) and the output thereof (i.e. the level of the electric image signal) in the aforesaid case. For example, the term "read-out conditions" means the read-out gain (sensitivity) determining the relationship between the input and the output of the read-out means, the scale factor (latitude), and the power of the stimulating rays used for the read-out.

As mentioned above, the level of the stimulating rays used in the preliminary read-out is adjusted to be lower than the level of the stimulating rays used in the final read-out. That is, the effective energy of the stimulating rays which the stimulable phosphor sheet receives per unit area in the preliminary read-out is adjusted to be lower than the effective energy of the stimulating rays used in the final read-out.

In the case where the image information stored on the stimulable phosphor sheet is approximately ascertained prior to the final read-out and the final read-out is carried out by use of the read-out conditions adjusted on the basis of the image information, it becomes possible to eliminate the adverse effects of a fluctuation in the level of the radiation energy stored on the stimulable phosphor sheet, which is caused by a change in the object or the image recording portion thereof, by a fluctuation in the radiation dose, or the like, and to obtain a visible image suitable for viewing, particularly for diagnostic purposes.

On the other hand, in the case where the aforesaid radiation image recording and reproducing system is used for medical diagnosis, portions of the human body not related to diagnosis should not be exposed to the radiation since it is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in the aforesaid radiation image recording and reproducing system, the irradiation field is often limited in the course of recording a radiation image.

In the case where image recording is carried out by limiting the irradiation field as mentioned above, a portion inside of the irradiation field and a portion outside of the irradiation field are present on a single stimulable phosphor sheet. In this case, it is advantageous for the portion inside of the irradiation field, i.e. the position of the irradiation field contour, to be able to be discriminated.

This is because, in the case where, for example, the preliminary read-out is carried out on the stimulable phosphor sheet and the read-out conditions for the final read-out are to be adjusted on the basis of the image information obtained by the preliminary read-out, the read-out conditions should preferably be adjusted on the basis of only the preliminary read-out image information inside of the irradiation field on the stimulable phosphor sheet when image recording has been carried out by limitation of the irradiation field.

The aforesaid reason will hereinbelow be described in detail. As the method of adjusting the read-out conditions for the final read-out on the basis of the image information obtained by the preliminary read-out, a novel method has been proposed in, for example, Japanese Unexamined Patent Publication No. 60(1985)-156055. The proposed method comprises the steps of: determining a histogram of the image information (image signal level) obtained by the preliminary read-out, calculating the maximum image signal level Pmax and the minimum image signal level Pmin of a desired image information range in the histogram, and adjusting the read-out conditions for the final read-out so that the maximum image signal level Pmax and the minimum image signal level Pmin correspond respectively to the maximum signal level Qmax and the minimum signal level Qmin of a desired input signal range in an image processing means which are determined by the maximum density Dmax and the minimum density Dmin of the correct density range in the reproduced visible image.

However, in the case where image recording is carried out by limitation of the irradiation field as mentioned above, the radiation scattered by the object within the irradiation field normally passes outside of the irradiation field. The scattered radiation is absorbed and stored on the stimulable phosphor sheet which exhibits high sensitivity, and therefore the histogram of the image information (image signal level) obtained by the preliminary read-out includes the image signal level caused by the scattered radiation. Since the image signal level caused by the scattered radiation outside of the irradiation field on the stimulable phosphor sheet is often higher than the image signal level inside of the irradiation field, it is not always possible to discriminate between the image signal levels inside and outside of the irradiation field in the histogram obtained by the preliminary read-out. Therefore, in the case where Pmax and Pmin are calculated from the histogram as mentioned above and the read-out conditions are adjusted on the basis of Pmax and Pmin, the minimum image signal level inside of the irradiation field is not detected as Pmin, and that caused by the scattered radiation outside of the irradiation field is detected as Pmin. In general, the minimum image signal level outside of the irradiation field is lower than that inside of the irradiation field. Accordingly, when the minimum image signal level outside of the irradiation field is detected as Pmin, signals caused by the scattered radiation not related to diagnosis are taken within a low density range in the final read-out, and the density of the image of the portion related to diagnosis becomes too high. As a result, the image contrast decreases and it becomes difficult to make an accurate diagnosis.

Namely, in the case where a radiation image is recorded by limiting the irradiation field, the radiation scattered by the object passes outside of the irradiation field on the stimulable phosphor sheet and causes noise in the image information obtained by the preliminary read-out. Therefore, when the read-out conditions are adjusted based on such preliminary read-out image information, it is not always possible to adjust the read-out conditions to appropriate values and to obtain a visible image suitable for viewing, particularly for diagnostic purposes.

Therefore, in the case where radiation image recording is carried out by limiting the irradiation field and the read-out conditions are to be adjusted based on the preliminary read-out image information by use of the aforesaid method, the irradiation field should be recognized accurately and the read-out conditions should be adjusted based on the preliminary read-out image information inside of the irradiation field, thereby to eliminate the adverse effects of the scattered radiation outside of the irradiation field.

Besides the case wherein the read-out conditions are to be adjusted for a radiation image stored on the stimulable phosphor sheet, recognition of the irradiation field is also necessary for various purposes in the case where a radiation image is recorded on a recording medium by limitation of the irradiation field.

On the other hand, in the aforesaid radiation image recording and reproducing system, image processing is carried out as mentioned above on the image signals detected by image read-out. In general, the image processing is carried out by use of image processing conditions adjusted for each image in accordance with the image recording portion of the object and/or the image recording method to obtain a visible image suitable for viewing, particularly for diagnostic purposes. However, it may be considered that the image processing conditions be adjusted on the basis of the image information obtained by, for example, the preliminary read-out or the final read-out, instead of the image recording portion of the object and/or the image recording method, or on the basis of both the image information obtained by the preliminary readout or the final read-out and the image recording portion of the object and/or the image recording method.

However, as mentioned above, in the case where image recording is carried out by limiting the irradiation field, information (noise) caused by the scattered radiation outside of the irradiation field is contained in the image information obtained by the preliminary read-out or the final read-out. Therefore, in this case, it is not always possible to obtain such appropriate image processing conditions as originally expected to be obtained by the adjustment based on the image information, even though the image processing conditions are adjusted on the basis of the image information obtained by the preliminary read-out or the final read-out.

Therefore, in the case where image recording is carried out by limiting the irradiation field and the image processing conditions are to be adjusted based on the image information as mentioned above, the image processing conditions should preferably be adjusted based on noise-free image information obtained by eliminating the information caused by the scattered radiation, instead of being adjusted directly based on the detected image information.

Besides the case of image recording utilizing the stimulable phosphor sheet, the aforesaid problems with regard to the adjustment of the image processing conditions arise generally in the case where a radiation image is recorded on a recording medium by limitation of the irradiation field.

By the term "image processing conditions" as used herein are meant various conditions affecting the relationship between the input to the image processing means and the output thereof, for example, gradation processing conditions and frequency response processing conditions.

SUMMARY OF THE INVENTION

The primary object of the present invention is to provide a method of recognizing an irradiation field in the case where a radiation image is recorded on a recording medium such as a stimulable phosphor sheet by limiting the irradiation field.

Another object of the present invention is to provide a method of adjusting the image processing conditions based on noise-free image information obtained by eliminating the information caused by scattered radiation outside of the irradiation field in the case where a radiation image is recorded on a recording medium such as a stimulable phosphor sheet by limiting the irradiation field.

The present invention provides a first method of recognizing an irradiation field wherein an irradiation field is recognized in the case where a radiation image is recorded on a recording medium by limitation of the irradiation field, the method of recognizing the irradiation field comprising the steps of:

(i) detecting image signals at their respective positions on said recording medium on the basis of the image information detected from said recording medium, (ii) subjecting said image signals to difference processing for calculating the differences between said image signals, and creating a difference image constituted by the difference values, (iii) preparing a predetermined threshold value Th, scanning said difference image or a processed difference image, which is obtained by subjecting said difference image to predetermined processing, in a single scanning direction, and detecting predetermined sections each of which is intercepted between a position where a difference value not smaller than +Th is present and a position where a difference value not larger than −Th is present on each scanning line, and (iv) recognizing the total of said predetermined sections on the respective scanning lines as the irradiation field.

The present invention also provides a first method of adjusting image processing conditions in the case where image information detected from a recording medium carrying a radiation image stored thereon by limitation of an irradiation field is processed, the method of adjusting image processing conditions comprising the steps of:

(i) detecting image signals at respective positions on said recording medium on the basis of the image information detected from said recording medium, (ii) subjecting said image signals to difference processing for calculating the differences between said image signals, and creating a difference image constituted by the difference values, (iii) preparing a predetermined threshold value Th, scanning said difference image or a processed difference image, which is obtained by subjecting said difference image to predetermined processing, in a single scanning direction, and detecting predetermined sections each of which is intercepted between a position where a difference value not smaller than +Th is present and a position where a difference value not larger than −Th is present on each scanning line, (iv) recognizing the total of said predetermined sections on the respective scanning lines as the irradiation field, and (v) adjusting said image processing conditions on the basis of the image information inside of said recognized irradiation field in said image information detected from said recording medium.

The present invention further provides a second method of recognizing an irradiation field wherein an irradiation field is recognized in the case where a radiation image is recorded on a recording medium by limitation of the irradiation field, the method of recognizing an irradiation field comprising the steps of:

(i) detecting image signals at their respective positions on said recording medium on the basis of the image information detected from said recording medium, (ii) subjecting said image signals to difference processing for calculating differences between said image signals, and creating a difference image constituted by the difference values, (iii) preparing a predetermined threshold value Th, scanning said difference image or a processed difference image, which is obtained by processing said difference image by a predetermined processing method, in at least two scanning directions, and detecting predetermined ranges each of which is formed by a group of predetermined sections respectively intercepted between a position where a difference value not smaller than +Th is present and a position where a difference value not larger than −Th is present on the respective scanning lines in each of at least two said scanning directions, and (iv) recognizing a predetermined region formed on the basis of said predetermined ranges detected in at least two said scanning directions as the irradiation field.

The present invention further provides a second method of adjusting image processing conditions in the case where image information detected from a recording medium carrying a radiation image stored thereon by limitation of an irradiation field is processed, the method of adjusting image processing conditions comprising the steps of:

(i) detecting image signals at their respective positions on said recording medium on the basis of the image information detected from said recording medium, (ii) subjecting said image signals to difference processing for calculating differences between said image signals, and creating a difference image constituted by the difference values, (iii) preparing a predetermined threshold value Th, scanning said difference image or a processed difference image, which is obtained by processing said difference image by a predetermined processing method, in at least two scanning directions, and detecting predetermined ranges each of which is formed by a group of predetermined sections respectively intercepted between a position where a difference value not smaller than +Th is present and a position where a difference value not larger than −Th is present on respective scanning lines in each of at least two said scanning directions, (iv) recognizing a predetermined region formed on the basis of said predetermined ranges detected in at least two said scanning directions as the irradiation field, and (v) adjusting said image processing conditions on the basis of the image information inside of said recognized irradiation field in said image information detected from said recording medium.

By the term "recording medium" as used herein is meant a medium capable of recording a radiation image thereon, such as a stimulable phosphor sheet. However, the recording medium is not limited to the stimulable phosphor sheet.

By the term "image information detected from a recording medium" is meant the image information detected by reading out a radiation image recorded on a recording medium by any method, for example, the image information detected by the preliminary read-out or the final read-out from the stimulable phosphor sheet. However, said image information is not limited to the information detected in this manner from the stimulable phosphor sheet.

Of course, the method of utilizing the irradiation field recognized in accordance with the present invention is not limited to any particular method.

Also, in the first and second methods of adjusting image processing conditions in accordance with the present invention, the image information utilized for recognition of the irradiation field and the image information utilized for adjustment of the image processing conditions may be identical or different from each other. For example, the irradiation field may be recognized based on the final read-out image information, and the image processing conditions may be adjusted based on the final read-out image information inside of the irradiation field. Or, the irradiation field may be recognized based on the preliminary read-out image information, and the image processing conditions may be adjusted based on the preliminary read-out image information or the final read-out image information inside of the irradiation field.

Adjustment of the image processing conditions on the basis of the image information inside of the irradiation field embraces the case wherein the adjustment is carried out based on only the image information inside of the irradiation field and the case wherein the adjustment is carried out based on the image information inside of the irradiation field and the other factors such as the image recording portion of the object and/or the image recording method.

Also, adjustment of the image processing conditions may be carried out in any manner insofar as the adjustment is effected on the basis of the image information inside of the irradiation field, i.e. by the utilization of said image information.

The image processing conditions may typically be gradation processing conditions, but are not limited thereto.

As mentioned above, with the first method of recognizing an irradiation field in accordance with the present invention, the difference image is created by carrying out the difference processing of the image signals at respective positions on the recording medium, and the difference image or the processed difference image which is obtained by subjecting the difference image to a predetermined processing is scanned in a single direction. The predetermined sections, each of which is intercepted between a position where a difference value not smaller than $+Th$ is present and a position where a difference value not larger than $-Th$ is present on each scanning line, are detected and the total of the predetermined sections on the respective scanning lines is recognized as the irradiation field.

The levels of the image signals at the respective positions on the recording medium are proportional to the levels of energy of the radiation impinging upon the respective positions on the recording medium. Therefore, the image signals in the region outside of the irradiation field are generally of a low quantum level, and the image signals inside of the irradiation field are generally of a high quantum level. Accordingly, the difference value between the image signals at a portion where the contour of the irradiation field is present becomes markedly larger or smaller than the difference values at the other portions, and it is possible to detect the positions of the contour of the irradiation field, and consequently the section inside of the irradiation field intercepted between said positions, by detecting the position where the difference value is markedly large and the position where the difference value is markedly small by use of the threshold value $Th$ adjusted to an appropriate value.

That is, the predetermined sections on the respective scanning lines in the first method of recognizing an irradiation field in accordance with the present invention correspond to sections inside of the irradiation field on the respective scanning lines. Therefore, with the first method of recognizing an irradiation field in accordance with the present invention wherein the total of the predetermined sections on the respective scanning lines is recognized as the irradiation field, the irradiation field can be recognized accurately.

With the first method of adjusting image processing conditions in accordance with the present invention, the irradiation field is recognized by use of the aforesaid first method of recognizing an irradiation field in accordance with the present invention, and the image processing conditions are adjusted based on the image information inside of the recognized irradiation field.

In the case where the irradiation field is detected and only the image information inside of the irradiation field is extracted, the image information thus extracted represents the true image information obtained by removing the image information caused by scattered radiation outside of the irradiation field from the image information detected from the overall area of the recording medium, i.e. the true image information free from noise caused by scattered radiation.

Therefore, with the first method of adjusting image processing conditions in accordance with the present invention, the adjustment of the image processing conditions can be effected based on the true image information free from noise caused by scattered radiation, and consequently the image processing conditions can be adjusted to more appropriate values.

With the second method of recognizing an irradiation field in accordance with the present invention, the difference image is created by carrying out the difference processing of the image signals at their respective positions on the recording medium, and the difference image or the processed difference image which is obtained by processing the difference image by a predetermined processing method is scanned in at least two scanning directions. The predetermined ranges each of which is formed by a group of predetermined sections respectively intercepted between a position where a difference value not smaller than $+Th$ is present and a position where a difference value not larger than $-Th$ is present on the respective scanning lines in each of the scanning directions are detected in the respective scanning directions. The predetermined region formed on the basis of the predetermined ranges detected in the scanning directions is recognized as the irradiation field.

As mentioned above, the predetermined sections on the respective scanning lines correspond to sections inside of the irradiation field on the respective scanning lines. Therefore, the predetermined range constituted, for example, by a group of the predetermined sections on the respective scanning lines in one scanning direction should coincide with the true irradiation field. However, actually they do not necessarily coincide exactly with each other for various reasons.

With the second method of recognizing an irradiation field in accordance with the present invention wherein the predetermined ranges obtained by scanning in at least two different directions are used, the predetermined region which is to be recognized as the irradiation field can be formed by combining the predetermined ranges, and the region closer to the true irradiation field can be recognized as the irradiation field.

With the second method of adjusting image processing conditions in accordance with the present invention, the irradiation field is recognized by use of the aforesaid second method of recognizing an irradiation field in accordance with the present invention, and the image processing conditions are adjusted based on the image information inside of the recognized irradiation field. Accordingly, the same effects as with the first method of adjusting image processing conditions in accordance with the present invention can be obtained.

BRIEF DESCRIPTION OF THE DRAWINGS

FIG. 2 is an enlarged view of portion A shown in FIG. 1 and showing digital image signals at their respective positions on the stimulable phosphor sheet, FIGS. 3A to 3F are schematic views showing difference operators, FIG. 14 is a schematic view showing the stimulable phosphor sheet carrying radiation images stored thereon by subdivision image recording, FIG. 15 is a schematic view showing the threshold value-processed difference images obtained in the case of the stimulable phosphor sheet shown in FIG. 14, FIGS. 16A and 16B are schematic views showing the threshold value-processed difference images obtained in the case where the irradiation field is limited to a circular shape, FIG. 17A is a schematic view showing the stimulable phosphor sheet carrying a radiation image stored thereon by limitation of the irradiation field into an oblique rectangular shape, and FIG. 17B is a schematic view showing the threshold value-processed difference image obtained in the case of the stimulable phosphor sheet shown in FIG. 17A.

DESCRIPTION OF THE PREFERRED EMBODIMENTS

The present invention will hereinbelow be described in further detail with reference to the accompanying drawings. First, an embodiment of the first method of recognizing an irradiation field in accordance with the present invention will be described below.

Figure 1:
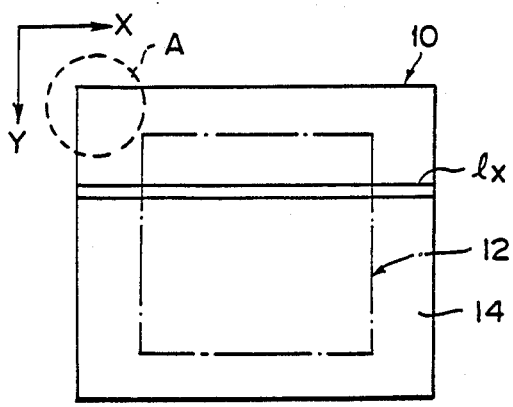
FIG. 1 is a schematic view showing the stimulable phosphor sheet carrying a radiation image stored thereon by limitation of the irradiation field.

The embodiment described below is for the case where an irradiation field 12 is recognized on the basis of preliminary read-out image information detected from a stimulable phosphor sheet 10 carrying a radiation image stored thereon by limitation of the irradiation field in a rectangular form as shown in FIG. 1. An X axis and a Y axis shown in FIG. 1 are set along two adjacent sides of the contour of the rectangular irradiation field 12. In general, in the case of the rectangular irradiation field, an irradiation field stop is disposed so that the respective sides of the rectangular contour of the irradiation field are parallel to the respective sides of the stimulable phosphor sheet 10. Therefore, it may be considered that the X and Y axes are set along the two adjacent sides of the stimulable phosphor sheet 10.

In this embodiment, the image information stored on the stimulable phosphor sheet 10 shown in FIG. 1 is first detected by carrying out the preliminary read-out as mentioned above from the stimulable phosphor sheet 10.

By "detecting image information from the stimulable phosphor sheet 10 by preliminary read-out" is meant scanning the stimulable phosphor sheet 10 with preliminary read-out stimulating rays which cause the stimulable phosphor sheet 10 to emit light in proportion to the stored radiation energy, detecting the emitted light by use of a photoelectric conversion means, and obtaining information constituted by electric signals corresponding to light emission amounts at the respective scanning points, i.e. the respective picture elements, on the stimulable phosphor sheet.

Then, digital image signals at their respective positions on the stimulable phosphor sheet 10 are obtained from the preliminary read-out image information detected by the preliminary read-out in the manner mentioned above The digital image signals may be obtained directly from the preliminary read-out image information detected by the preliminary read-out, or may be obtained by carrying out preprocessing such as spatial filter processing on the image information.

In the case where the digital image signals are to be obtained directly, position setting on the stimulable phosphor sheet 10 may be carried out in the unit of the picture element, and a signal obtained by digitizing the preliminary read-out image information at the picture element corresponding to each position may be used as the digital image signal at said position.

In the case where the digital image signals are to be obtained by carrying out a pre-processing such as spatial filter processing on the preliminary read-out image information, for example, a plurality of picture elements in a specific relation to each other may be set as a single position, and the digital image signal at said position may be calculated based on the preliminary read-out image information at the picture elements included in said position by, for example, arithmetic averaging of the preliminary read-out image information. Or, position setting on the stimulable phosphor sheet 10 may be effected in the unit of the picture element, and the digital image signal at said position may be calculated based on the preliminary read-out image information at said position and at a plurality of picture elements corresponding to the positions around said position.

In this embodiment, the position setting on the stimulable phosphor sheet 10 is carried out in the unit of the picture element, and a signal obtained by digitizing the preliminary read-out image information at the picture element corresponding to each position is used as the digital image signal at said position.

FIG. 2 is an enlarged view showing portion A of the stimulable phosphor sheet 10 in FIG. 1. In FIG. 2, each cell indicates a single picture element (position), and f(1,1), f(1,2) . . . in the respective picture elements represent the digitized preliminary read-out image information at the respective picture elements (1,1), (1,2), . . .

After the digital image signals at the respective positions are obtained in the manner mentioned above, difference processing is carried out on the digital image signals, and a difference image constituted by difference values is created.

By the term "difference processing" as used herein is meant processing for calculating a difference value at a predetermined position on the basis of a difference between the digital image signals in a predetermined relation to each other, for example, between the digital image signals at positions adjacent to each other or in the vicinity of said predetermined position Specifically, difference processing means processing for calculating the difference values by use of difference operators as shown in FIGS. 3A to 3F.

In the difference processing using the operator as shown in FIG. 3A, subtraction is carried out between the digital image signals at positions adjacent to each other in the X axis direction, and the value thus calculated is used as the difference value. For example, in FIG. 2, a digital image signal f(3,3) at a position (3,3) is subtracted from a digital image signal f(3,4) at a position (3,4), and the value thus calculated is used as the difference value at the position (3,3).

In the difference processing using the operator as shown in FIG. 3B, subtraction is carried out between the digital image signals at positions on opposite sides of a predetermined position in the X axis direction, and the value thus calculated is used as the difference value at said predetermined position. For example, in FIG. 2, a digital image signal f(3,2) at a position (3,2) is subtracted from a digital image signal f(3,4) at the position (3,4), and the value thus calculated is used as the difference value at the position (3,3).

In the difference processing using the operator as shown in FIG. 3C, subtraction is carried out between the digital image signals at positions adjacent to each other in the Y axis direction, and the value thus calculated is used as the difference value. For example, in FIG. 2, the digital image signal f(3,3) at a position (3,3) is subtracted from a digital image signal f(4,3) at a position (4,3), and the value thus calculated is used as the difference value at the position (3,3).

In the difference processing using the operator as shown in FIG. 3D, subtraction is carried out between the digital image signals at positions on opposite sides of a predetermined position in the Y axis direction, and the value thus calculated is used as the difference value at said predetermined position. For example, in FIG. 2, a digital image signal f(2,3) at a position (2,3) is subtracted from the digital image signal f(4,3) at the position (4,3), and the value thus calculated is used as the difference value at the position (3,3).

In the difference processing using the operator as shown in FIG. 3E, processing is carried out by simultaneously using the operator as shown in FIG. 3A and the operator as shown in FIG. 3C. For example, in FIG. 2, the value calculated by subtracting the digital image signal f(3,3) at the position (3,3) from the digital image signal f(3,4) at the position (3,4) is added to the value calculated by subtracting the digital image signal f(3,3) at the position (3,3) from the digital image signal f(4,3) at the position (4,3), and the sum thus calculated is used as the difference value at the position (3,3).

In the difference processing using the operator as shown in FIG. 3F, processing is carried out by simultaneously using the operator as shown in FIG. 3B and the operator as shown in FIG. 3D. For example, in FIG. 2, the value calculated by subtracting the digital image signal f(3,2) at the position (3,2) from the digital image signal f(3,4) at the position (3,4) is added to the value calculated by subtracting the digital image signal f(2,3) at the position (2,3) from the digital image signal f(4,3) at the position (4,3), and the sum thus calculated is used as the difference value at the position (3,3).

The difference values may be calculated at all positions or only at a part thereof selected appropriately.

In this embodiment, difference values are calculated at all positions by use of the operator as shown in FIG. 3A, and a difference image constituted by the difference values is created.

Thereafter, a predetermined threshold value Th is prepared, the difference image created in the manner as mentioned above or a processed difference image obtained by processing the difference image in an appropriate manner is scanned in a single direction, and a predetermined section intercepted between a position where a difference value not smaller than +Th is present and a position where a difference value not larger than −Th is present on each scanning line is detected.

In this embodiment, the method of detecting the predetermined section by using the processed difference image is employed. Specifically, threshold value processing wherein the predetermined threshold value Th is used is carried out on the difference values calculated in the manner mentioned above. The difference values are encoded so that a difference value not smaller than +Th is taken as +1, a difference value not larger than −Th is taken as −1, and the other difference value, i.e. a difference value smaller than +Th and larger than −Th, is taken as 0. The processed difference image obtained by the threshold value processing and constituted by the threshold value-processed difference values thus encoded is scanned in the X axis direction. When the combination of +1 with −1 is found on each scanning line, the section intercepted between +1 and −1 is detected as the predetermined section on said scanning line.

Figure 4:
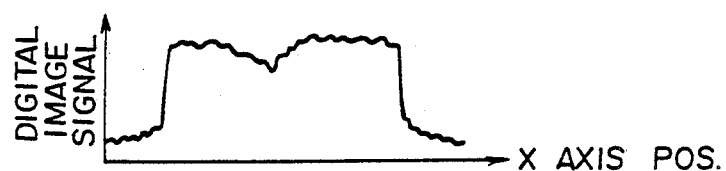
FIG. 4 is a graph showing the digital image signals on line 1x shown in FIG. 1.
Figure 5:
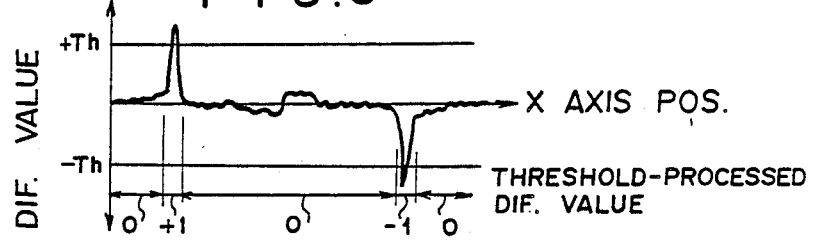
FIG. 5 is a graph showing the difference values obtained by a difference processing of the digital image signals shown in FIG. 4, FIGS. 6, 7 and 8 are schematic views showing the difference images created by use of various difference operators.
Figure 6:
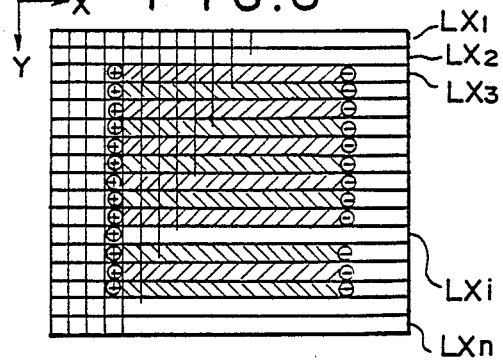

FIG. 4 is a graph showing the digital image signals on an arbitrary line lx in the X axis direction in FIG. 1. FIG. 5 is a graph showing the difference values obtained by the difference processing of the digital image signals shown in FIG. 4 wherein the difference operator as shown in FIG. 3A is used, and the threshold value processing for converting the difference values into the three-valued system as mentioned above. FIG. 6 shows the threshold value-processed difference image which is constituted by the threshold value-processed difference values (−1, 0, +1) obtained by carrying out the threshold value processing for all lines in the X axis direction. In FIG. 6, the threshold value-processed difference values +1 and −1 are expressed simply as + and −, and the portion where no + nor − is indicated corresponds to the portion where the threshold value-processed difference value is 0.

The digital image signals at the respective positions on the stimulable phosphor sheet 10 are proportional to the level of energy of the radiation impinging upon the sheet 10. Therefore, as shown in FIG. 4, the image signals at a region 14 outside of the irradiation field shown in FIG. 1 are generally of a low quantum level, and the image signals inside of the irradiation field are generally of high quantum level. Accordingly, as shown in FIG. 5, the difference value between the image signals at a portion where the contour of the irradiation field is present becomes markedly larger or smaller than the difference values at the other portions, and it is possible to detect the positions of the contour of the irradiation field, and consequently the section inside of the irradiation field intercepted between said positions, by detecting the position where the difference value is markedly large and the position where the difference value is markedly small by use of the threshold value Th adjusted to an appropriate value. Thus detection of the predetermined section indicated by hatching in FIG. 6 and intercepted between the position where the difference value is not smaller than +Th and the position where the difference value is not larger than −Th on each of scanning lines LX1, LX2, LX3, ..., LXi, ..., LXn as shown in FIG. 6 by scanning the difference image in the X axis direction is equivalent to detection of the section inside of the irradiation field on each scanning line.

In FIG. 6, since the scanning lines LX1 and LX2 are positioned in the region 14 outside of the irradiation field, the difference value not smaller than +Th and the difference value not larger than −Th are not present on these scanning lines. Also, as in the case of the scanning line LXi, the combination of the position where the difference value is not smaller than +Th with the position where the difference value is not larger than −Th may not be present even on a line inside of the irradiation field 12. In this case, no predetermined section is regarded as being detected on the scanning line.

Also, in the case where the threshold value processing is carried out in the same manner as mentioned above by using the difference operator as shown in FIG. 3B, a difference image similar to that shown in FIG. 6 is obtained, and the predetermined section may be detected by scanning the difference image in the same manner as mentioned above.

Figure 7:
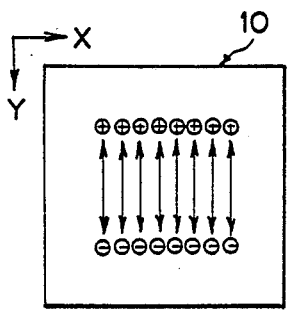

In the case where the difference operator as shown in FIG. 3C or FIG. 3D is used, a difference image as shown in FIG. 7 is obtained. In this case, the predetermined section on each scanning line as indicated by the double directed arrows in FIG. 7 may be detected by scanning the difference image in the Y axis direction.

Figure 8:
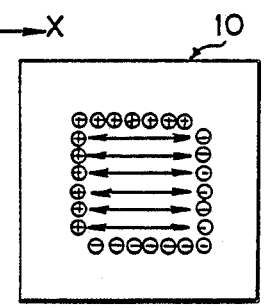

In the case where the difference operator as shown in FIG. 3E or FIG. 3F is used, a difference image as shown in FIG. 8 is obtained. In this case, the predetermined section may be detected on each scanning line by scanning the difference image in the X axis direction or in the Y axis direction. In FIG. 8, the double directed arrows are shown to indicate the predetermined sections detected by scanning in the X axis direction.

In sum, in the aforesaid embodiment, the threshold value processing is carried out on the difference image for encoding all difference values so that the difference value not smaller than +Th, the difference value not larger than −Th, and the other difference values may be discriminated from one another. The threshold value-processed difference image constituted by the threshold value-processed difference values (+1, 0, −1) and created by the threshold value processing is scanned to detect the predetermined section. However, it is also possible to use a different processing method. For example, threshold value processing for encoding only a part of the difference values as in the case of semi threshold value processing wherein a difference value between Th and −Th is taken as 0 and the other difference values are not changed may be carried out, and the predetermined section may be detected by scanning the threshold value-processed difference image constituted by the threshold value-processed difference values obtained by said processing.

Figure 9:
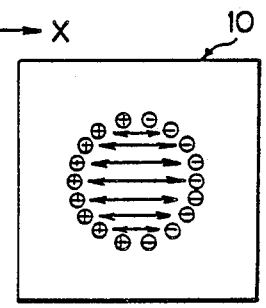
FIG. 9 is a schematic view showing the difference image obtained in the case where the irradiation field is limited to a circular shape.

FIG. 9 shows a threshold value-processed difference image created in the same manner as mentioned with reference to FIGS. 3A to 3F in the case where the irradiation field is limited to a circular form. As is clear from FIG. 9, the first method of recognizing an irradiation field in accordance with the present invention is also applicable to the cases where the irradiation field is limited to a shape different from the rectangular shape. Even in the case of subdivision image recording wherein the image recording region on a single stimulable phosphor sheet is divided into a plurality of subdivisions and image recording is carried out on the respective subdivisions, it is possible to apply the first method of recognizing an irradiation field in accordance with the present invention to the respective subdivisions by, for example, obtaining information on the subdivision image recording in advance.

In the first method of recognizing an irradiation field in accordance with the present invention, the difference image is scanned in a single direction to detect the predetermined section. The scanning direction is not necessarily arbitrary and is fixed by the manner of calculating the difference values, as will be understood from the foregoing descriptions.

The concept behind the term "difference value" as used herein also embraces the concept of the differentiated value which is substantially identical to the difference value, and the concept behind the term "difference processing" as used herein also embraces the concept of the differentiation processing which is substantially identical to the difference processing.

The irradiation field recognized in the manner as mentioned above may be utilized for various purposes. For example, the irradiation field can be utilized in the case where only the image information inside of the irradiation field is extracted from the preliminary readout image information as mentioned above and the readout conditions are adjusted based on the extracted image information, and in the case where only the image information inside of the irradiation field is extracted from the final read-out image information and the image processing conditions are adjusted based on the extracted image information, as will be described below. Also, the irradiation field can be utilized in the case where only the image information inside of the irradiation field is extracted from the preliminary read-out image information and the image processing conditions are adjusted based on the extracted image information. The irradiation field can also be utilized for other purposes, for example in the case where the irradiation field is recognized from the preliminary read-out image information and the read-out region in the final read-out is limited to the region inside of the irradiation field as disclosed in, for example, Japanese Unexamined Patent Publication No. 60(1985)-120346. In the case where the read-out region in the final read-out is limited to the region inside of the irradiation field, noise components caused by scattered radiation and stored outside of the irradiation field on the stimulable phosphor sheet are not detected in the final read-out, and a final visible image having a high image quality can be obtained. Also, since the read-out region is limited, it becomes possible to shorten the read-out time or to increase the read-out density.

Besides the preliminary read-out image information as in the aforesaid embodiment, recognition of the irradiation field in accordance with the present invention may be effected based on the other image information, for example, based on the final read-out image information.

An embodiment of the first method of adjusting image processing conditions in accordance with the present invention will now be described below The embodiment described below is for the case where the irradiation field is recognized on the basis of the final read-out image information detected from the stimulable phosphor sheet carrying a radiation image stored thereon by limitation of the irradiation field, and gradation processing conditions as one kind of the image processing conditions are adjusted based on the final read-out image information inside of the recognized irradiation field.

In this embodiment, the image information is obtained by carrying out the final read-out on the stimulable phosphor sheet.

In order to obtain the image information by carrying out the final read-out, the stimulable phosphor sheet is scanned with stimulating rays, and the light emitted by the stimulable phosphor sheet when scanned with stimulating rays is detected by a photoelectric read-out means. The image information obtained by the final read-out means the information which is constituted by electric signals corresponding to light emission amounts at the respective scanning points, i.e. the respective picture elements, on the stimulable phosphor sheet.

Then, digital image signals at their respective positions on the stimulable phosphor sheet are detected from the image information obtained in the manner as mentioned above, the digital image signals are subjected to difference processing for calculating the differences between the image signals, and a difference image constituted by the difference values is created. Also, a predetermined threshold value Th is prepared, the difference image or a processed difference image, which is obtained by subjecting the difference image to a predetermined processing, is scanned in a single scanning direction, and predetermined sections each of which is intercepted between a position where a difference value not smaller than +Th is present and a position where a difference value not larger than −Th is present on each scanning line are detected. The total of the predetermined sections on the respective scanning lines is recognized as the irradiation field.

The method of recognizing the irradiation field utilized in this embodiment is the same as the aforesaid first method of recognizing an irradiation field in accordance with the present invention.

Then, the gradation processing conditions are adjusted on the basis of the image information inside of the recognized irradiation field in the final read-out image information detected from the stimulable phosphor sheet. The adjustment may be carried out in various manners, for example by the method described below.

Specifically, there may be used a method comprising the steps of: determining a histogram of the final read-out image information (image signal level) inside of the irradiation field, calculating the maximum image signal level Pmax and the minimum image signal level Pmin of a desired image signal range in the histogram, and adjusting the gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of the correct density range in the reproduced visible image.

Figure 10:
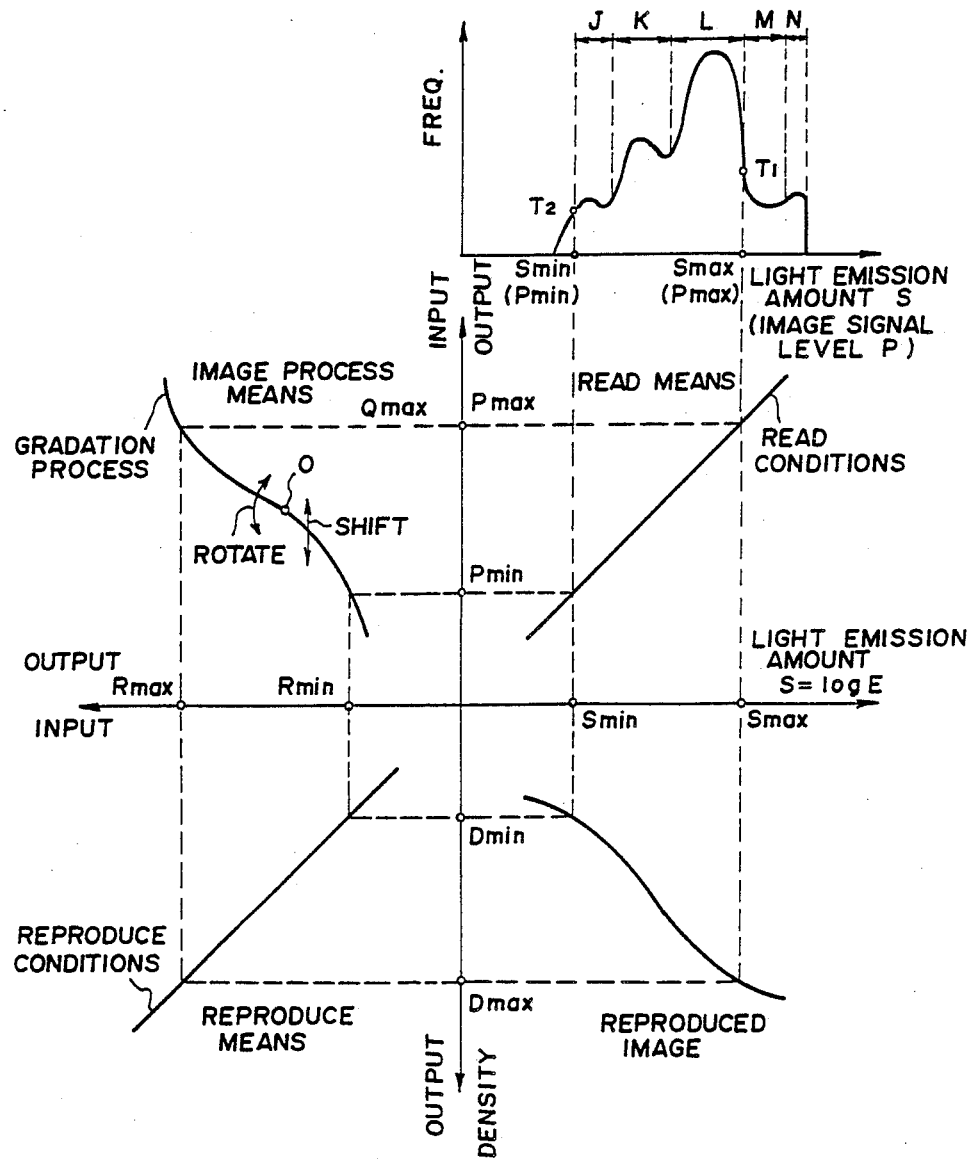
FIG. 10 is a graph showing the step of adjusting the gradation processing conditions on the basis of a desired image information range.

The aforesaid method will hereinbelow be described in detail with reference to FIG. 10. In FIG. 10, instead of a histogram of electric image signals obtained by photoelectrically detecting the light emitted by a stimulable phosphor sheet by use of a photoelectric read-out means, a histogram of the light emission amounts of the stimulable phosphor sheet prior to photoelectric detection thereof is shown. The light emission amounts are converted into electric image signals by use of fixed and linear read-out conditions as shown in FIG. 10. Therefore, the light emission amounts and the image signal level have a proportional relationship to each other with a fixed constant of proportional relationship to each other with a fixed constant of proportionality, and the histogram of the light emission amounts is substantially equivalent to the histogram of the image signals. Accordingly, in the following descriptions, the histogram of the light emission amounts as shown in FIG. 10 is regarded as the histogram of the image signals.

The image information used for the creation of the histogram in this embodiment need not necessarily be the information detected by use of the linear read-out conditions as mentioned above insofar as the image information has some correspondent relationship with the light emission amounts, and may be the image information detected by use of, for example, non-linear read-out conditions.

Specifically, in this method, a histogram of the final read-out image information (image signals) inside of the irradiation field is created, and a desired image signal range (range of the amount of emitted light) is determined on the basis of the histogram. Since the pattern of the histogram is approximately fixed by the image recording portion of an object and/or the image recording method, the desired image signal range is determined from the histogram with reference to the image recording portion of an object and/or the image recording method. For example, in the case of chest image recording, the pattern of the histogram becomes as shown in FIG. 10, and it is possible to know that J in the histogram denotes the mediastinum, K denotes the heart, L denotes the lungs, M denotes the skin and the soft tissue, and N denotes the region outside of the object. Therefore, from the histogram, it is possible to calculate the maximum image signal level Pmax (i.e. the maximum light emission amount Smax) and the minimum image signal level Pmin (i.e. the minimum light emission amount Smin) defining the desired image signal range. For example, in the case where information on the skin and the soft titter (M) and information on the region outside of the object (N) are unnecessary in FIG. 10, the desired image signal range becomes that from Pmax to Pmin including J, K and L as shown. The maximum image signal level Pmax and the minimum image signal level Pmin may be calculated by use of various methods from e histogram, for example, by determining threshold values T1 and T2 in accordance with the desired image signal range and calculating Pmax and Pmin on the basis of T1 and T2.

On the other hand, in the radiation image recording and reproducing system, electric image signals are generally obtained from the light emitted by the stimulable phosphor sheet in proportion to the stored radiation energy by use of the photoelectric read-out means as mentioned above, and are subjected to various signal processings in the image processing means, particularly gradation processing. The processed image signals are used to reproduce a visible image on a photographic film or the like by use of the image reproduction means. The reproduced visible image should have a correct density range suitable for viewing, particularly for diagnostic purposes. In general, the correct density range (Dmax to Dmin) is determined in advance. Also, image reproducing conditions in the image reproduction means (ie.e. the conditions determining the relationship between the input to the image reproduction means and the output therefrom) are determined in advance. Therefore, the range of signal levels (Rmax to Rmin) which should be sent to the image reproduction means as suitable for obtaining the correct density range (Dmax to Dmin) is determined by the image reproducing conditions.

Accordingly, the gradation processing conditions in the gradation processing are adjusted so that the maximum image signal level Pmax and the minimum image signal level Pmin calculated int eh manner mentioned above correspond to the maximum signal level Rmax and the minimum signal level Rmin determined in the manner mentioned above.

The gradation processing is carried out for converting the level of each image signal fed to an image processing means (a gradation processing means) by use of predetermined conditions. The predetermined conditions are referred to as the graduation processing conditions, and the gradation processing conditions are usually expressed by a non-linear gradation curve.

The purpose of the gradation processing is to obtain a visible reproduced image suitable for viewing, particularly for diagnostic purposes, in accordance with the image recording conditions, for example the image recording portion of an object sub as the head or the chest, and/or the image recording method such as plain image recording or contrasted image recording. Therefore, in general, basic patterns of non-linear gradation processing conditions most suitable for the respective image recording conditions should preferably be determined in advance, one of the basic patterns of the gradation processing conditions should b e selected in accordance with the image recording conditions of an image in the course of gradation processing of the image, and the gradation processing should be carried out by use of the selected basic pattern.

Also in this embodiment, an appropriate basic pattern is selected form those of the gradation processing conditions predetermined in accordance with the image recording conditions of the images. The gradation processing conditions which are to be used are adjusted by correcting the selected basic pattern on the basis of the image information inside of the irradiation field, i.e. by, as shown in the second quadrant of FIG. 10, vertically shifting the selected basic pattern or rotating it around a predetermined center point O so that Pmax corresponds to Rmax or Pmin corresponds to Rmin.

Besides the on-linear gradation processing conditions determined by the image recording conditions mentioned above, linear gradation processing conditions may be used in some cases. In such a case, the gradation processing conditions which are to be used are adjusted by rotating or shifting a single predetermined straight line in the manner mentioned above so that Pmax corresponds to Rmax or Pmin corresponds to Rmin. The adjustment of the gradation processing conditions by this method is carried out on the basis of only the image information inside of the irradation field, instead of on the basis of the image recording portion of the object and/or the image recording method.

In the case where the gradation processing of the radiation image is carried out by use of the gradation processing conditions adjusted to appropriate values in accordance with each radaition image (image information) stored on the stimulable phosphor sheet, it becomes possible to process the image so that the necessary object image information is always expressed within the correct density range suitable for viewing, particularly for diagnostic purposes, in every reproduced visible image regardless of any fluctuation in the level of the radiation energy stored on the stimulable phosphor sheet, which is caused by changes in the object, the image recording portion thereof, the radiation dose, of the like.

Also, in this case, the gradation processing conditions can be adjusted based on the image information free from noise caused by scattered radiation in accordance with the present invention, and therefore the desired image information range can be determined more accurately from the image information histogram. As a result, the effects of expressing th necessary object image information within the correct density range are enhanced markedly.

The method of adjusting the gradation processing conditions in the manner mentioned hove is advantageous particularly in the case where the image information detected by use of the read-out conditions adjusted without considering a fluctuation in the radiation energy level range recorded in each image recording as mentioned above is to be processed.

An embodiment of the second method of recognizing an irradiation field in accordance with the present invention will be described hereinbelow.

In this embodiment, after the digital image signals at the respective positions on the stimulable phosphor sheet 10 are detected in the manner mentioned above with reference to FIGS. 1 and 2, a difference image is crated by carrying out difference processing on the image signals. The difference processing may be carried out in a single direction for calculating the deference values between the digital image signals only in a single direction, for example by using the difference operators as shown in FIGS. 3A, 3B, 3C and 3D. Or, the difference processing may be carried out in two or more directions for calculating he difference values between the digital image signals in two or more directions, for example by using the difference operators as shown in FIGS. 3E and 3F. The number of the difference images created by carrying out the difference processing in two or more directions is not necessarily limited to one, and a plurality of the difference images may be created. For example, in the case where the difference image is created by carrying out the deference processing in two directions, a single difference image may be created by using the difference operator as shown in FIG. 3E or FIG. 3F, or two difference images may be created respectively by using the difference operator as shown in FIG. 3A and the difference operator as shown in FIG. 3C.

In this embodiment, the difference processing is carried out in two directions to create a difference image (a difference image in the X axis direction) constituted by deference values at all positions by use of the difference operator as shown IN FIG. 3A, and a difference image (difference image in the Y axis direction) constituted by difference values at all positions by use of the difference operator as shown in FIG. 3C.

Thereafter, a predetermined threshold value TRh is prepared, the difference image thus created or a processed difference image obtained by processing the difference image in an appropriate manner s scanned in at least two directions which are not parallel to each other and should preferably be normal to each other. In this manner, a predetermined range formed by a group of predetermined sections intercepted between a position where a difference value not smaller than $+Th$ is present and a position where a difference value not larger than $-Th$ is present on the respective scanning lines is detected in each of the scanning directions.

In tis embodiment, the predetermined range is detected by using the processed difference image. Specifically, the aforesaid threshold value processing with the predetermined threshold value Th is carried out on the difference image in the X axis direction and the difference image in the Y axis direction created in the manner as mentioned above, and the difference values are encoded so that a difference value not smaller than $+Th$ is taken as $+1$, a difference value not larger than $-Th$ is taken as $-1$, and the other difference value, i.e. a difference value smaller than $+Th$ and larger than $-Th$, is taken as 0. The threshold value-processed difference image in the X axis direction and the threshold value-processed difference image in the Y axis direction constituted by the threshold value-processed difference values thus encoded are respectively scanned in the X axis direction and in the Y axis direction. A group of predetermined sections intercepted between $+1$ and $-1$ on the respective scanning lines in the X axis direction is detected as the predetermined range in the X axis direction. Also, a group of predetermined sections intercepted between $+1$ and $-b\ 1$ on the respective scanning lines in the Y axis direction is detected as the predetermined range in the Y axis direction.

Figure 11:
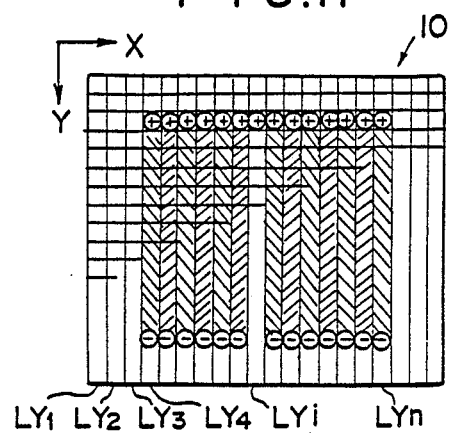
FIGS. 11 and 12 are schematic views showing the threshold value-processed difference images obtained by a threshold value processing of difference images respectively created by use of the difference operators shown in FIGS. 3C and 3E.

The threshold value-processed difference image in the X axis direction obtained with the difference operator as shown in FIG. 3A by carrying out the threshold value processing on all scanning lines in the X axis direction and constituted by the threshold value-processed difference values $(-1, 0, +1)$ becomes as shown in FIG. 6. FIG. 11 shows the threshold value-processed difference image in the Y axis direction obtained in the same manner by using the difference operator as shown in FIG. 3C.

Detection of the predetermined range formed by a group of the predetermined sections indicated by hatching in FIG. 6 and intercepted between the position where the difference value is not smaller than $+Th$ and the position where the deference value is not larger than $-Th$ on the respective scanning lines $LX1, LX2, LX3, \ldots, LXi, \ldots, LXn$ as shown in FIG. 6 by scanning said difference image in the X axis direction, in the scanning direction along the X axis, is equivalent to detection of the range corresponding to the irradiation field. This also applies to the detection of the predetermined range formed by a group of the predetermined sections on the respective scanning lines $LY1, LY2, LY3, \ldots, LYi, \ldots, LYn$ as shown in FIG. 11 by scanning said difference image in the Y axis direction in the scanning direction along the Y axis.

In this embodiment, two difference images are created by using the difference operators as shown in FIGS. 3A and 3C, and are respectively scanned in one direction to effect the difference image scanning in two directions and detect two predetermined ranges.

Creation of two difference images may also be carried out by, for example, using the difference operators as shown in FIGS. 3B and 3D. Also in the case where the difference e values are calculated by using the difference operators as shown IN FIGS. 3B and 3D and are subjected to the same threshold value processing as mentioned above, difference images similar to those shown in FIGS. 6 and 11 are obtained. Therefore, the predetermined ranges may be detected by scanning the difference images respectively in the X axis direction and in the Y axis direction in the same manner as mentioned above.

Figure 12:
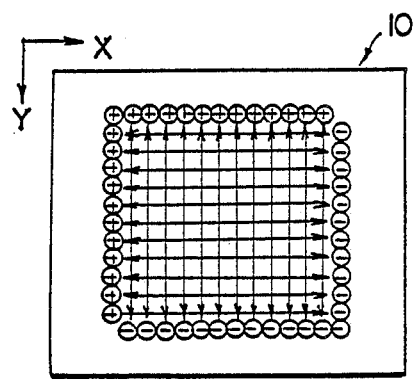

Alternatively, only a single difference image may be created and scanned in two directions to detect two predetermined ranges. For example, a difference image may be created by using the difference operator as shown in FIG. 3E or FIG. 3F and subjected to the same threshold value processing as mentioned above. In tis case, a threshold value-processed difference image as shown in FIG. 12 is obtained. Therefore, the difference image may be scanned in the X axis direction and in the Y axis direction to detect two predetermined ranges.

In FIG. 12, the arrows in the X axis direction and in the Y axis direction respectively indicate the predetermined sections on the respective scanning lines detected by scanning in the X axis direction and in the Y axis direction. The group of the predetermined sections indicated by the arrows in the X axis direction constitutes the predetermined range detected by the scanning int eh X axis direction, and the group of the predetermined sections indicated by the arrows in the UY axis direction constitutes the predetermined range detected by the scanning in the Y axis direction.

Also in this embodiment, the threshold value processing for encoding only apart of the difference values may be employed, and the threshold value-processed difference image constituted by the processed difference values obtained by said threshold value processing may be scanned to detect the predetermined ranges.

After the predetermined ranges int the respective scanning directions are detected in the manner as mentioned above, a predetermined region formed on the basis of the predetermined ranges is recognized as the irradiation field. In order to form the predetermined region (irradiation field region) which is to be recognized as the irradiation field, two techniques as described below, for example, may be used.

In the first technique, the total of the predetermined ranges is determined as the irradiation field region. In the second technique, the portion common to the predetermined ranges is determined as the irradiation field region.

Figure 13:
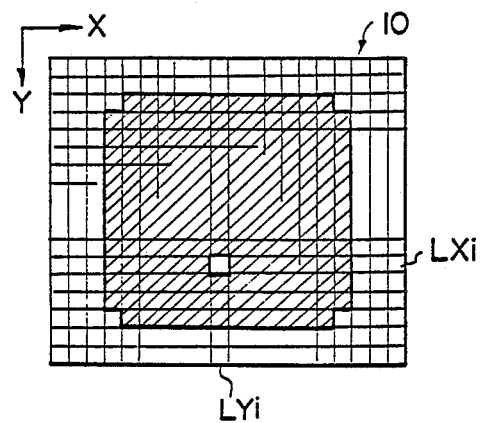
FIG. 13 is a schematic view showing the irradiation field region.

By "total of predetermined ranges " is meant the portion formed by clustering he predetermined ranges. In this case, even a portion belonging only to one of the predetermined ranges is regarded as the irradiation field region. Specifically, in the case where the predetermined range in the X axis direction as indicted by hatching in FIG. 6 and the predetermined range in the Y axis direction as indicated by hatching in FIG. 11 are detected, the range indicated by hatching in FIG. 13 formed by clustering the two predetermined ranges is determined as the irradiation field region. In the case where the irradiation field region is determined based only on the predetermined range detected by the scanning in a single direction and a line on which no predetermined section is detected, as in the case of the line LXi in FIG. 6 or the line LYi in FIG. 11, the problem that the undetected predetermined section which should be regarded as the irradiation field region cannot be detected as the irradiation field region arises. However, in the case where the total of the predetermined ranges detected by the scanning in two direction is determined as the irradiation field region as in this embodiment, the aforesaid problem does not arise, and it becomes possible to determine the range, which covers almost all the area of the part corresponding to the true irradiation field region as the irradiation field region, though the intersection of the line LXi with the line LYi is missed as shown in FIG. 13.

On the other hand, by "portion common to predetermined ranges " is meant the portion belonging to both predetermined ranges. In this case, a portion belonging only to one of the predetermined ranges is not regarded as the irradiation field region. This technique is suitable for the case of the subdivision image recording wherein, as shown in FIG. 14, the area of the stimulable phosphor sheet 10 is divided into two subdivisions and image recording is carried out at the respective subdivisions by limiting the irradiation field. Specifically, in the case of the subdivision image recording, the threshold value-processed difference image crated in the same manner as in FIG. 12 may become incomplete as shown in FIG. 15, i.e. positions D, D which should be encoded as ⊖ and ⊕ may not become ⊖ and ⊕. In such a case, the predetermined sections (predetermined range) detected by scanning the difference image in the X axis direction become as indicated by the double directed arrows in the X axis direction (in this case, canning is carried out from left to right in the X axis direction, only the ⊕→⊖ section is detected as the predetermined section, and the ⊖→⊕ section is not detected), and the predetermined sections (predetermined range) detected by the scanning in the Y axis direction becomes as indicated by the double directed arrows in the Y axis direction. When the cluster of the predetermined ranges is determined as the irradiation field region, the portion which does not belong to the irradiation field region (the portion between the positions D, D) is regarded as the irradiation field region. However, in the case where only the portion common to the predetermined ranges in the two scanning directions is determined as the irradiation field region as with this technique, the portion which does not belong to the irradiation field region is eliminated, and it is possible to determine only the portion, which corresponds to the irradiation field, as the irradiation field region.

FIGS. 16A and 16B show the threshold value-processed difference images created in the same manner as mentioned with reference to FIGS. 6 and 11 in the case where the irradiation field is limited to a circular form. As is clear form FIGS. 16A and 16B, the second method of recognizing an irradiation field in accordance with the present invention is also applicable to the cases where the irradiation field is limited to a shape different from the rectangular shape.

FIG. 17A shows the stimulable phosphor sheet 10 carrying a radiation image stored thereon by limiting the irradiation field to an oblique rectangular form. In this case, the difference operator as shown in, for example, FIG. 3A may be used to calculate the difference values in the axis direction and create a difference image, and the same threshold value processing as mentioned above with reference to FIG. 6 may be carried out on the difference image. In this manner, a threshold value-processed difference image as shown in FIG. 17B is obtained. The difference image is scanned in the X' axis direction and in the Y' axis direction as shown in FIG. 17B to detect the predetermined ranges in the respective directions.

In the case of the subdivision image recording, the second method of recognizing an irradiation field in accordance with the present invention may be applied to the respective subdivisions on the stimulable phosphor sheet by obtaining the information on the subdivision image recording in advance.

An embodiment of the second method of adjusting the image processing conditions in accordance with the present invention will now be described below.

The embodiment described below is for the case where the irradiation field is recognized on the basis of final read-out image information detected from the stimulable phosphor sheet carrying a radiation image stored thereon by limitation of the irradiation image stored thereon by conditions as one kind of the image processing conditions are adjusted based on the final read-out image information inside of the recognized irradiation field.

In this embodiment, the image information is obtained by carrying out the final read-out on the stimulable phosphor sheet.

Then, digital image signals at their respective positions on the stimulable phosphor sheet are detected from the image information obtained in the manner mentioned above, the digital image signals are subjected to a difference processing for calculating the differences between the image signals, and a difference image constituted by the difference values is created. Also, a predetermined threshold value Th is prepared, the difference image or a processed difference image, which is obtained by processing the difference image by a predetermined processing method, is scanned in at least two scanning directions, and predetermined ranges, each of which is formed by a group of predetermined sections respectively intercepted between a position where a difference value not smaller than +Th is present and a position where a difference value not larger than −Th is present on the respective scanning lines in each of the scanning directions, are detected. A predetermined region formed on the basis of the predetermined ranges detected in the scanning directions is recognized as the irradiation field.

The method of recognizing the irradiation field utilized in this embodiment is the same as th aforesaid second method of recognizing an irradiation field in accordance with the present invention.

Then, the gradation processing conditions are adjusted on the basis of the image information inside of the recognized irradiation field in the final read-out image information detected from the stimulable phosphor sheet. The adjustment may be carried out in various manners, for example, by the method mentioned above with reference to FIG. 10.

It should be understood that the first and second methods of recognizing an irradiation field and the first and second methods of adjusting the image processing conditions in accordance with the preset invention are not limited to the aforesaid embodiments, and may be embodies in various other manners.

I claim:

1. A method of recognizing an irradiation field wherein an irradiation field is recognized in the case where a radiation image is recorded on a recording medium by limitation of the irradiation field, the method of recognizing an irradiation field comprising the steps of:
   (i) detecting image signals at their respective positions on said recording medium on the basis of the image information detected from said recording medium,
   (ii) subjecting said image signals to deference processing for calculating the differences between said image signals, and creating a difference image constituted by the difference values,
   (iii) preparing a predetermined threshold value Th, scanning said difference image or a processed difference image, which is obtained by subjecting said difference image to predetermined processing, in a single scanning direction, and detecting predetermined sections each of which is intercepted between a position where a difference value not smaller than +Th is preset and a position where a difference value not larger than −Th is present or each scanning line, and
   (iv) recognizing the total of said predetermined sections on the respective scanning lines as the irradiation field.

2. A method of recognizing an irradiation field as defined in claim 1 wherein said processed difference image obtained by subjecting said processed difference image processing is a threshold value-processed difference image obtained by subjecting said difference image to threshold value processing for encoding all or a part of said difference values so that the difference value not smaller than +Th, the difference value not larger than −Th, and the other difference values are discriminable from one another.

3. A method of adjusting image processing conditions in the case where image information detected from a recording medium carrying a radiation image stored thereon by limitation of an irradiation field is processed, the method of adjusting image processing conditions comprising the steps of:
   (i) detecting image signals at their respective positions on said recording medium on the basis of the image information detected from said recording medium,
   (ii) subjecting said image signals to difference processing for calculating the differences between said image signals, and creating a difference image constituted by the difference values,
   (iii) preparing a predetermined threshold value Th, scanning said difference image or a processed difference image, which is obtained by subjecting said difference image to predetermined processing, in a single scanning direction, and detecting predetermined sections each of which is intercepted between a position where a difference value not smaller than +Th is present and a position where a difference value not larger than −Th is present, on each scanning line,
   (iv) recognizing the total of said predetermined sections on the respective scanning lines as the irradiation field, and
   (v) adjusting said image processing conditions on the basis of the image information inside of said recognized irradiation field in said image information detected from said recording medium.

4. A method of adjusting image processing conditions as defined in claim 3 wherein said processed difference image obtained by subjecting said difference image to a predetermined processing is a threshold value-processed difference image obtained by subjecting said difference image to threshold value processing for encoding all or a part of said difference values so that the difference value not smaller than +Th, the difference value not larger than −Th, and the other difference values are discriminable from one another.

5. A method of recognizing an irradiation field wherein an irradiation field is recognized in the case where a radiation image is recorded on a recording medium by limitation of the irradiation field, the method of recognizing an irradiation field comprising the steps of:
   (i) detecting image signals at their respective positions on said recording medium on the basis of the image information detected from said recording medium,
   (ii) subjecting said image signals to difference processing for calculating the differences between said image signals, and creating a difference image constituted by the difference values,
   (iii) preparing a predetermined threshold value Th, scanning said difference image or a processed difference image, which is obtained by processing said difference image by a predetermined processing method, in at least two scanning directions, and detecting predetermined ranges each of which is formed by a group of predetermined sections respectively intercepted between a position where a difference value not smaller than +Th is present and a position where a difference value not larger than −Th is present on respective scanning lines in each of said at least two scanning directions, and
   (iv) recognizing a predetermined region formed on the basis of said predetermined ranges detected in at least two said scanning directions as the irradiation field.

6. A method of recognizing an irradiation field as defined in claim 5 wherein said processed difference image obtained by processing said difference image by a predetermined processing method is a threshold value-processed difference image obtained by subjecting said difference image to threshold value processing of encoding all or a part of said difference values so that the difference value not smaller than +Th, the difference value not larger than −Th, and the other difference values are discriminable from one another.

7. A method of recognizing an irradiation field as defined in claim 5 or 6 wherein the total region of said predetermined ranges detected in the respective scanning directions is determined as said predetermined region.

8. A method of recognizing an irradiation field as defined in claim 5 or 6 wherein a portion common to said predetermined ranges detected in the respective scanning directions is determined as said predetermined region.

9. A method of adjusting image processing conditions in the case where image information detected from a recording medium carrying a radiation image stored thereon by limitation of an irradiation field is processed, the method of adjusting image processing conditions comprising the steps of:
 (i) detecting image signals at respective positions on said recording medium on the basis of the image information detected from said recording medium,
 (ii) subjecting said image signals to difference processing for calculating the differences between said image signals, and creating a difference image constituted by the difference values,
 (iii) preparing a predetermined threshold value Th, scanning said difference image or a processed difference image, which is obtained by processing said difference image by a predetermined processing method, in at least two scanning directions, and detecting predetermined ranges each of which is formed by a group of predetermined sections respectively intercepted between a position where a difference value not smaller than +Th is present and a position where a difference value not larger than −Th is present on respective scanning lines in each of said at least two scanning directions,
 (iv) recognizing a predetermined region formed on the basis of said predetermine ranges detected in at least two said scanning directions as the irradiation field, and
 (v) adjusting said image processing conditions on the basis of the image information inside of said recognized irradiation field in said image information detected from said recording medium.

10. A method of adjusting image processing conditions as defined in claim 9 wherein said processed difference image obtained by processing said difference image by a predetermined processing method is a threshold value-processed difference image obtained by subjecting said difference image to threshold value processing for encoding all or a part of said difference values so that the difference value not smaller than +Th, the difference value not larger than −Th, and the other difference values are discriminable from one another.

11. A method of adjusting image processing conditions as defined in claim 9 or 10 wherein the total region of said predetermined ranges detected in the respective scanning directions is determined as said predetermined region.

12. A method of adjusting image processing conditions as defined in claim 9 or 10 wherein a portion common to said predetermined ranges detected in the respective scanning directions is determined as said predetermined region.

* * * * *